July 4, 1961

C. BENNETT 2,991,409

POWER TRANSMISSIONS CONTROLLED BY SATURABLE REACTORS

Filed July 26, 1957

INVENTOR.
CLARENCE BENNETT
BY
ATTORNEYS

United States Patent Office 2,991,409
Patented July 4, 1961

2,991,409
POWER TRANSMISSIONS CONTROLLED BY SATURABLE REACTORS
Clarence Bennett, Crestwood, Mo., assignor to Vickers Incorporated, Detroit, Mich., a corporation of Michigan
Filed July 26, 1957, Ser. No. 674,513
4 Claims. (Cl. 323—89)

This invention relates to power transmissions, and more particularly to power supplies controlled by saturable electro-magnetic devices.

In electric arc welding, particularly in automatic welding processes, it is sometimes desirable to vary welding current magnitude as the welding time progresses. The normal welding current may be at essentially constant amperage, but at the start of the weld, or at the end of the weld it may be desirable to have the starting current high and to have the current-versus-time curve slope down to the normal welding current at a controllable rate, or to have a low starting current and to have the current-versus-time curve slope up to the normal welding current at a controllable rate. Similarly, as the end of the weld is approached, it may be desirable to have the curve of welding current versus time slope up or down from the normal welding current at a controllable rate. It is also desirable that any combination of up and down starting slope, and up and down tail slope be easily and quickly obtainable from the same piece of welding apparatus. As used hereinafter, the term "slope" refers to the slope of a curve plotting welding current versus time.

It is an object of this invention to provide a welding power supply in which the current at the start of the weld may be either high or low, and will be modified at a controlled, predetermined, and reproducible rate to arrive at the normal welding current.

It is a further object of this invention to provide such a power supply in which the welder output may be driven up or down from the normal welding current at a controlled predetermined and reproducible rate as the end of the weld is approached.

It is also an object of this invention to provide a welding power supply in which up or down starting slope or up or down tail slope may be easily and quickly selected. It is another object of this invention to provide such a power supply which is low in cost, rugged, and easy to maintain.

Further objects and advantages of the present invention will be apparent from the following description, reference being had to the accompanying drawing wherein a preferred form of the present invention is clearly shown.

Figures 1, 2:
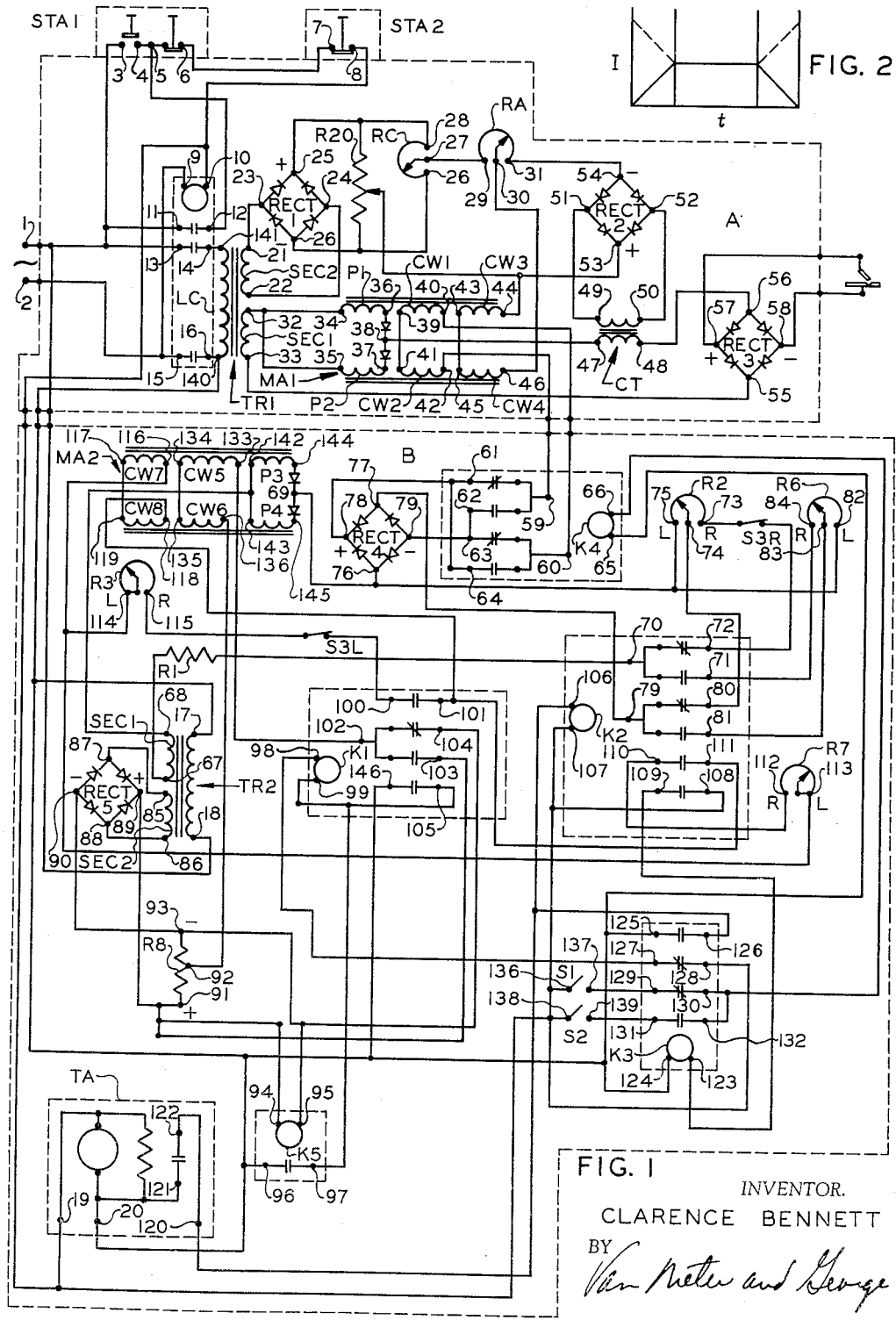
FIGURE 1 is a diagrammatic view of a welding power supply incorporating the present invention.
FIGURE 2 is a curve showing output current of the welder versus time.

The apparatus shown in the drawing includes a welder power supply generally designated A and a slope controller generally designated B. The welder A includes a saturable core magnetic amplifier designated MA1 and the slope controller B includes a saturable core magnetic amplifier designated MA2. Broadly, the invention contemplates applying the output of the amplifier MA2 to a control winding of MA1 in a direction such as to either aid or oppose the saturation of the cores of magnetic amplifier MA1. MA2 includes means which will be hereinafter described to cause its output to decay or rise at a controlled, predetermined, and reproducible rate.

As shown, the welder A consists of a line contactor LC with an auxiliary contact suitable for three wire control by momentary contact push button stations, a transformer TR1 having a secondary winding SEC1, and a secondary winding SEC2 which supplies voltage to a rectifier, RECT1, a magnetic amplifier of the doubler type designated MA1, having its main winding supplied by SEC1 of TR1, a current transformer CT and current rectifier designated RECT2, which are used for control purposes, and a power rectifier designated RECT3, which converts the alternating current output of the circuit up to this point into D.C., which is the welder output. Welder A also includes an adjustable resistance R20, and potentiometers RC and RA.

Control of the output current and voltage of welder A is accomplished by the magnetic amplifier MA1. This is a self-saturating magnetic amplifier with A.C. input and A.C. output. It has the characteristic that a control winding such as CW1—CW2, shown in the drawing, may carry current in a direction such that its M.M.F. either aids or opposes the M.M.F. of the power windings P1 and P2. When the M.M.F. of the control winding CW1—CW2 aids the M.M.F. of the power windings P1 and P2, the output power is increased. If the M.M.F. of the control winding CW1—CW2 opposes that of the power winding, output power is reduced. If more than one control winding is used, the polarity of the net M.M.F. with respect to the M.M.F. of the power windings determines the power output level.

A second control winding CW3—CW4 is provided for magnetic amplifier MA1. The polarity of the M.M.F. produced by this winding may aid or oppose the M.M.F. of the power winding P1—P2 depending on the desired normal output from the welder.

Control winding CW1—CW2 is energized by the output of the slope controller B. The basic purpose of the slope controller is to bias the core of the magnetic amplifier MA1 so that its output is different for a period of time than is dictated by the welder controls.

The control amplifier MA2 of slope controller B is of the self-saturating type and includes a main winding P3—P4, a first control winding CW5—CW6 and a second control winding CW7—CW8. To accomplish adjustable starting and tail slope time control, windings CW5—CW6 and CW7—CW8 are arranged to affect the degree of saturation of the core of self-saturating magnetic amplifier MA2. Control winding CW5—CW6 is a bias winding connected to a D.C. source of potential, RECT5.

If the circuit of time delay control winding CW7—CW8 were open and the potential of RECT5 applied across the terminals of CW5—CW6, the output of amplifier MA2 would change rapidly because of the low time constant of the winding. In practice, this time constant would be of the order of two or three cycles of the supply frequency.

Since CW5—CW6 is on the same core as winding CW7—CW8, the two control windings of MA2 are inductively coupled. If now the circuit of winding CW7—CW8 is closed by a rheostat, such as starting slope time control rheostat R3, which is in its minimum resistance position, closing the circuit of winding CW5—CW6 to a source of D.C. potential such as rectifier 5 will cause a current to flow in winding CW7—CW8. This current will generate a counter E.M.F. in winding CW5—CW6 which will prevent steady state current flow in this winding til the current in CW7—CW8 is dissipated by the winding resistance. A time delay of the order of 30 seconds can be achieved with a time delay control winding of commercially practicable turns and conductor size.

It will be seen that by providing a rheostat such as R3 of sufficiently high maximum resistance across time delay winding CW7—CW8, it is possible to establish a time delay which is adjustable from a short to a relatively long period of time.

A pair of rheostats R2 and R6, one for weld start control and one for weld tail control, are selectively connectable in shunt across the terminals of the output RECT4 of MA2, through switching to be hereinafter described. These rheostats are utilized to adjust the maximum output from MA2. As was previously noted, MA2 is of the self-saturating type and when the main winding P3—P4 is energized, power will immediately be supplied to the welder control winding CW1—CW2 of MA1. When the current in winding CW5—CW6 of MA2 is in a direction such that its M.M.F. opposes the self-saturating M.M.F. of main winding P3—P4, the output of MA2 will be driven from its initial maximum down to substantially zero at a rate dependent on the setting of the start rheostat R3 which is interposed between the ends of windings CW7—CW8. Conversely, if the current in winding CW5—CW6 is reversed while the output of MA2 is at substantially zero, that output will be driven up to a preselected maximum at a rate dependent on the setting of tail rheostat R7.

A reversing switch K4 is provided in the output of the slope controller A which enables the output of the slope controller to be applied to control winding CW1—CW2 of MA1 in a direction such as to provide an M.M.F. which either increases or decreases the degree of saturation of the core of MA1.

It will be seen that since the output of slope controller B starts high and may be reduced to near zero, and conversely, at a controlled and adjustable rate, the output of MA1 of the welder A may be modified in a variety of ways. For example, assume that the welder controls are set for a particular normal welding current. If at the start of welding the output of slope controller B is applied to winding CW1—CW2 in a direction such as to aid the saturating M.M.F. the initial welder output will be higher than the normal current setting and will be reduced to that normal current setting at a rate dependent on the setting of the rheostat R3. If the output of slope controller A is applied to winding CW1—CW2 so as to create a bucking M.M.F. the initial output of MA1 will be less than the normal welding current and will rise to the normal welding current at a rate dependent on the setting of rheostat R3. In like manner, if the output of slope controller A is applied to winding CW1—CW2 at a point prior to the termination of welding, the welder output may be driven up or down as the end of the weld is approached at a rate dependent on the setting of rheostat R7 which couples the ends of winding CW7—CW8 of amplifier MA2 for tail slope control.

The usual mode of operation of a welder incorporating this invention is to drive the welder output up to the normal welding current at the start of the weld and at the end of the weld drive to drive the output down from the normal welding current. In the following discussion of operation of the welder and slope control, this specific mode of operation will be described. However, it will be understood that any combination of up or down start and tail slope may be accomplished.

With the alternating current input terminals 1 and 2 energized from an appropriate source, closing the normally open start button of momentary contact push button station STA1 initiates operation.

The welder line contactor coil is energized by a circuit from A.C. line terminal 1 through a series circuit including terminals 3, 4 and 5, 6, and 7 of the push-button stations, STA1 and STA2 from terminal 8 to terminal 10 of the contactor coil. This circuit is completed by a connection between coil terminal 9 and line terminal 2. Auxiliary contact terminals 11 and 12 shunt the normally open push-button terminals 3 and 4 so that the contactor will not drop out when the normally open push-button is released and its contact opened.

Closure of the line contactor energizes the primary of transformer TR1 by the connection line terminal 1 to contactor terminal 13 and from terminal 14 to transformer terminal 141. The other connection is made from line terminal 2 to contactor terminal 15 and from terminal 16 to transformer terminal 140.

The primary of transformer TR2 of slope controller B is energized by a connection between line terminal 1 and transformer primary terminal 18 and from contactor terminal 16 to transformer primary terminal 17.

The synchronous motor timer TA is energized by connection of its terminal 19 with terminal 10 of the line contactor coil and terminal 20 with contactor terminal 16.

Terminal 68 of SEC1 of transformer TR2 is connected at 69 to the connection between terminals 142, 143 of the reactor power windings of MA2. Terminal 67 is connected to terminal 70, relay K2 and from the normally closed contact 72 to terminal 73 of the starting slope current control potentiometer R2 with switch S3R in series between terminals 72 and 73. Terminal 75 is connected with terminal 76 of rectifier RECT4. The arm of potentiometer R2, terminal 74, is connected with terminal 80, relay K2. The normally closed contact 79 is connected with terminal 77 of RECT4. The normally open contact, terminal 81, of K2 is connected with the potentiometer arm terminal 83 of the tail slope current control potentiometer R6. Terminal 82 of this potentiometer is connected to terminal 75 of potentiometer R2 and terminal 84 of R6 is connected with terminal 71 of the normally open contact relay K2. The terminal 70 of K2 connects with terminal 67 of SEC1, transformer TR2 through series resistor R1.

Terminals 85 and 86 of SEC2, transformer TR2, connect respectively with the A.C. input terminals 87 and 88 of bridge rectifier RECT5. The positive terminal 89 of this rectifier is connected with terminal 91 of the center-tap resistor R8. The negative terminal 90 of RECT5 is connected with terminal 93 of resistor R8.

Center-tap terminal 92 of R8 is connected with 136 of control winding CW5—CW6 of MA2. From terminal 133 of this winding, connection is made with terminal 102 of relay K1. From the normally closed contact of terminal 104 of relay K1 connection is made with terminal 90 of RECT4.

The coil of relay K5 is energized by the connection of coil terminals 94 and 95 with the D.C. output terminals 89 and 90 of RECT5. Relay K5 is selected to be of the D.C. type because of the inherent time delay in this type of relay, as will be hereinafter explained. A circuit is then completed between terminal 16 of the line contactor LC and terminal 96 of K5. The normally open contact 97 of K5 is connected with coil terminal 99 of relay K1 and normally open contact 105 of K1. Coil terminal 98 of K1 is connected with terminal 127 of relay K3. From the normally closed contact terminal 128 of K3 connection is made with terminal 10 of the line contactor coil, energizing relay K1. Relay K5 is selected to be of the D.C. type which has an inherent time delay for reasons to be hereinafter explained.

Energization of relay K1 establishes the following conditions. From terminal 100 of relay K1, connection is made with terminal 115 of starting slope time control rheostat R3 through series switch S3L. Terminal 114 of R3 connects with terminal 116 of time delay winding CW7—CW8 of MA2, and with terminal 113 of tail slope time control rheostat R7. Terminal 112 of R7 connects with terminal 110 of relay K2.

Normally open contact terminal 103 of relay K1 connects with the positive terminal 89 of RECT4.

Contact 146 of relay K1 connects with terminal 125 of relay K3. Normally open contact 105 of relay K1 connects with line contactor terminal 16 through relay K5.

Starting slope welding conditions have now been established and welding begun. The starting slope current and time control will proceed as a function of the setting of starting slope current control potentiometer R2 and starting slope time control rheostat R3. The initial output of the welder will be low, since the output of slope controller A is applied to winding CW1—CW2 in a bucking direction, and will rise to the normal welding current at a controlled rate established by the setting of starting slope time control R3.

Initiation of tail slope in the illustrated embodiment is by the expiration of the preset time of timer TA, the timing cycle of which was activated when the start button of STA1 was originally pushed. It will be understood that other means such as a limit switch on the welder carriage could be utilized to control the point at which tail slope control is initiated.

At the expiration of the preset time of timer TA, a circuit is established from line contactor terminal 16 through terminal 121 of timer TA, and normally open contact 122 to coil terminal 106 of relay K2 and terminal 126 of relay K3. As terminal 107 of K2 is connected with coil terminal 10 of the line contactor it is energized resulting in the following circuit conditions:

Starting slope current control potentiometer R2 is disconnected from the circuit by the opening of normally closed contacts 72 and 80, relay K2, and tail slope current control potentiometer R6 is made operative by the closing of normally open contacts 71 and 81 relay K2.

Tail slope time control rheostat R7 is connected from terminal 112 to terminal 110 of relay K2 and from normally open contact 111 to terminal 118 of winding CW7—CW8 of amplifier MA2.

From coil terminal 123 of relay K3, connection is made to terminal 109 of relay K2. From normally open contact 108 of relay K2 connection is made to coil terminal 10 of the line contactor. As coil terminal 124 is connected with line contactor terminal 16, relay K3 is energized.

Energization of relay K3 results in terminal 125 of relay K3 being connected with coil terminal 16 of the line contactor. Normally open contact terminal 126 connects with coil terminal 106 of relay K2 and coil terminal 98 of relay K1.

Terminal 127 of relay K3 is connected with coil terminal 98 of relay K1. Normally closed contact 128 of relay K3 is connected with line contactor coil terminal 10. As K3 is now energized the normally closed contacts 127, 128 of K3 are now open and relay K1 is de-energized.

De-energization of relay K1 results in opening the connection between terminal 115 of the starting slope time control rheostat R3 and terminal 118 of the winding CW7—CW8 through normally open contacts 100—101 of relay K1.

The polarity of the voltage applied to coil terminals 133, 136 of winding CW5—CW6 of MA2 is reversed by the switching of terminal 102 of relay K1 from its prior positive polarity derived from positive terminal 89 of RECT5 and normally open contact 103, to negative polarity derived from terminal 90 of RECT5 through normally closed contact terminal 104 of relay K1.

Circuit conditions are now appropriate for tail slope current and time control which will proceed as a function of the settings of R6 and R7.

After tail slope control is accomplished, pushing the normally closed button of either push button station STA1 or STA2 will open the coil circuit of the line contactor, de-energize the welder and slope controller and recycle the control circuits.

The foregoing mode of operation will produce a welder output current versus time curve of the nature shown in the solid line of FIGURE 2. The starting slope time interval being adjustable through rheostat R3 and the tail slope time interval being adjustable through rheostat R7.

It will be seen that if switch S1 is closed, reversing switch K4 will be energized during the starting phase and the output of MA2 of slope controller A will be applied to winding CW1—CW2 in an opposite direction to that in the earlier described mode of operation, thus providing a down slope of the starting welding current. The welder current starting slope curve will then be as shown by the downward sloping dotted curve in FIGURE 2.

Similarly, if switch S2 is closed, actuation of relay K3 by timer TA will energize reversing switch K4 to apply the output of MA2 of slope controller A to winding CW1—CW2 in an opposite direction to that in the earlier discussed mode of operation, thus providing an up slope of the tail welding current, as shown by the dotted up sloping line in FIGURE 2.

The heretofore noted time delay inherent in D.C. relay K5 affects initial transient conditions and is an important feature of this invention. When the normally open start button of STA1 is pushed to initiate welding, the winding P3—P4 of magnetic amplifier MA2 is immediately energized from secondary winding SEC1 of transformer TR2. The control winding CW5—CW6 is also immediately energized from SEC2 of TR2 and RECT5 and MA2 is at saturation, and hence maximum output. The delay in actuation of relay K5 may be of the order of 4 cycles of the supply frequency, and in this time, MA2 reaches saturation. When relay K5 closes, relay K1 is actuated and reversal of polarity in winding CW5—CW6 and closing of the circuit between the ends of time delay winding CW7—CW8 are simultaneously effected. The output of MA2 is thus driven down at a controlled, predetermined rate from a reproducible, exact maximum output which is re-established prior to each cycle of operation.

If it were not for the time delay in relay K5, the reset time would approximate the starting slope time setting, since without such a delay the magnitude of the starting current would be unpredictable due to the varying residual flux of the core of amplifier MA2.

It will be seen from the foregoing that there has been provided a highly flexible, accurate, and efficient power supply apparatus for welding.

While the form of embodiment of the invention as herein disclosed constitutes a preferred form, it is to be understood that other forms might be adopted, all coming within the scope of the claims which follow.

What is claimed is as follows:

1. A welding power supply apparatus which includes input terminals for connection to a power supply, output terminals for connection to a welding electrode and work, a saturable core reactor, a power winding on said reactor through which load current flows to said output terminals, a slope control winding for said reactor, a time-function variable control current source for said slope control winding, said control current source comprising a saturable core reactor having a power winding through which the control current flows to said slope control winding, a bias winding connected to a power source, and a time delay winding having interconnected ends, and means rendering said control current source effective at the start and prior to the termination of welding.

2. A welding power supply apparatus which includes input terminals for connection to a power supply, output terminals for connection to a welding electrode and work, a saturable core reactor, a power winding on said reactor through which load current flows to said output terminals, a slope control winding for said reactor, a time-function variable control current source for said slope control winding, said control current source comprising a saturable core reactor having a power winding through which the control current flows to said slope control winding, a bias winding connected to a power source, a time delay winding having interconnected ends, and a rheostat interposed between said ends, and means rendering said control current source effective at the start and prior to the termination of welding.

3. A welding power supply apparatus which includes input terminals for connection to a power supply, output terminals for connection to a welding electrode and work, a saturable core reactor, a power winding on said reactor through which load current flows to said output terminals, a slope control winding for said reactor, a time-function variable control current source for said slope control winding, said control current source comprising a saturable core reactor having a power winding through which the control current flows to said slope control winding, a bias winding connected to a power source, a time delay winding, a pair of rheostats, and switch means for selectively interconnecting the ends of said time delay winding across one of said rheostats at the start of welding and across the other of said rheostats prior to the termination of welding.

4. A welding power supply apparatus which includes input terminals for connection to a power supply, output terminals for connection to a welding electrode and work, a saturable core reactor, a power winding on said reactor through which load current flows to said output terminals, a slope control winding for said reactor, a time-function variable control current source for said slope control winding, said control current source comprising a saturable core reactor having a power winding through which the control current flows to said slope control winding, a bias winding connected to a power source, a time delay winding having interconnectable ends, and a rheostat interposed between said ends, time delay means for interconnecting said ends subsequent to energization of said bias winding, and means rendering said control current source effective at the start and prior to the termination of welding.

References Cited in the file of this patent

UNITED STATES PATENTS

| | | |
|---|---|---|
| 2,721,304 | Silver et al. | Oct. 18, 1955 |
| 2,724,797 | Storm | Nov. 22, 1955 |
| 2,774,930 | Bixby | Dec. 18, 1956 |
| 2,780,771 | Lee | Feb. 5, 1957 |
| 2,825,866 | Morse | Mar. 4, 1958 |

FOREIGN PATENTS

| | | |
|---|---|---|
| 322,775 | Great Britain | Dec. 2, 1929 |